United States Patent [19]

Hager

[11] Patent Number: 4,508,102
[45] Date of Patent: Apr. 2, 1985

[54] HEAT COLLECTION, DISSIPATION AND STORAGE

[76] Inventor: Ira V. Hager, P.O. Box 5845, Hilton Head Island, S.C. 29928

[21] Appl. No.: 184,194

[22] Filed: Sep. 5, 1980

[51] Int. Cl.³ .............................................. F24J 3/02
[52] U.S. Cl. ..................................... 126/437; 165/18; 126/400
[58] Field of Search ......... 126/435, 400, 437, DIG. 2, 126/422; 237/50, 46; 165/18

[56] References Cited

U.S. PATENT DOCUMENTS

| 3,022,781 | 2/1962 | Andrassy . | |
|---|---|---|---|
| 3,072,920 | 1/1963 | Yellott . | |
| 3,563,305 | 2/1971 | Hay . | |
| 3,893,506 | 7/1975 | Laing . | |
| 4,068,652 | 1/1978 | Worthington | 126/435 |
| 4,193,543 | 3/1980 | Viesturs et al. | 126/400 |
| 4,237,863 | 12/1980 | Harrison | 126/437 |
| 4,248,049 | 2/1981 | Briley | 126/437 |

FOREIGN PATENT DOCUMENTS

| 2749714 | 5/1979 | Fed. Rep. of Germany | 126/437 |
|---|---|---|---|
| 1521637 | 8/1978 | United Kingdom | 126/DIG. 2 |

OTHER PUBLICATIONS

HUD, "Intermediate Minimum Property Standards . . . ", 1977.
"Energy Primar", 1974, Fricke-Parks Press, Inc.
Popular Science, Jul. 1976, pp. 48 & 51.
Popular Science II, Dec. 1977, pp. 80 & 81.

*Primary Examiner*—Henry Bennett
*Attorney, Agent, or Firm*—Cushman, Darby & Cushman

[57] ABSTRACT

Heat collection and dissipation are provided utilizing a roofing system having a support sheet with an upstanding edge around its periphery and a pair of water impermeable membranes disposed in the volume defined by the support sheet and upstanding edge. Water is pumped from a storage tank to an inlet between the membranes for filling the membranes with water, and from an outlet at a drain point for withdrawing water from between the membranes. Air between the membranes is exhausted through a valve. The water storage tank associated with the roofing system has an outer surface with a number of vertical interior divisions defining the volume into compartments. A liquid conduit extends from the top of each conduit to the bottom of the adjacent conduit, and an inlet is provided to the bottom of one of the compartments and an outlet is provided from the top of one of the compartments. Vertical and horizontal stratification of the storage liquid by temperature is provided by the interior divisions and liquid conduits. Electrical controls responsive to temperature sensing at various components operate pumps, valves, and the like to direct liquid flow to the desired components.

2 Claims, 3 Drawing Figures

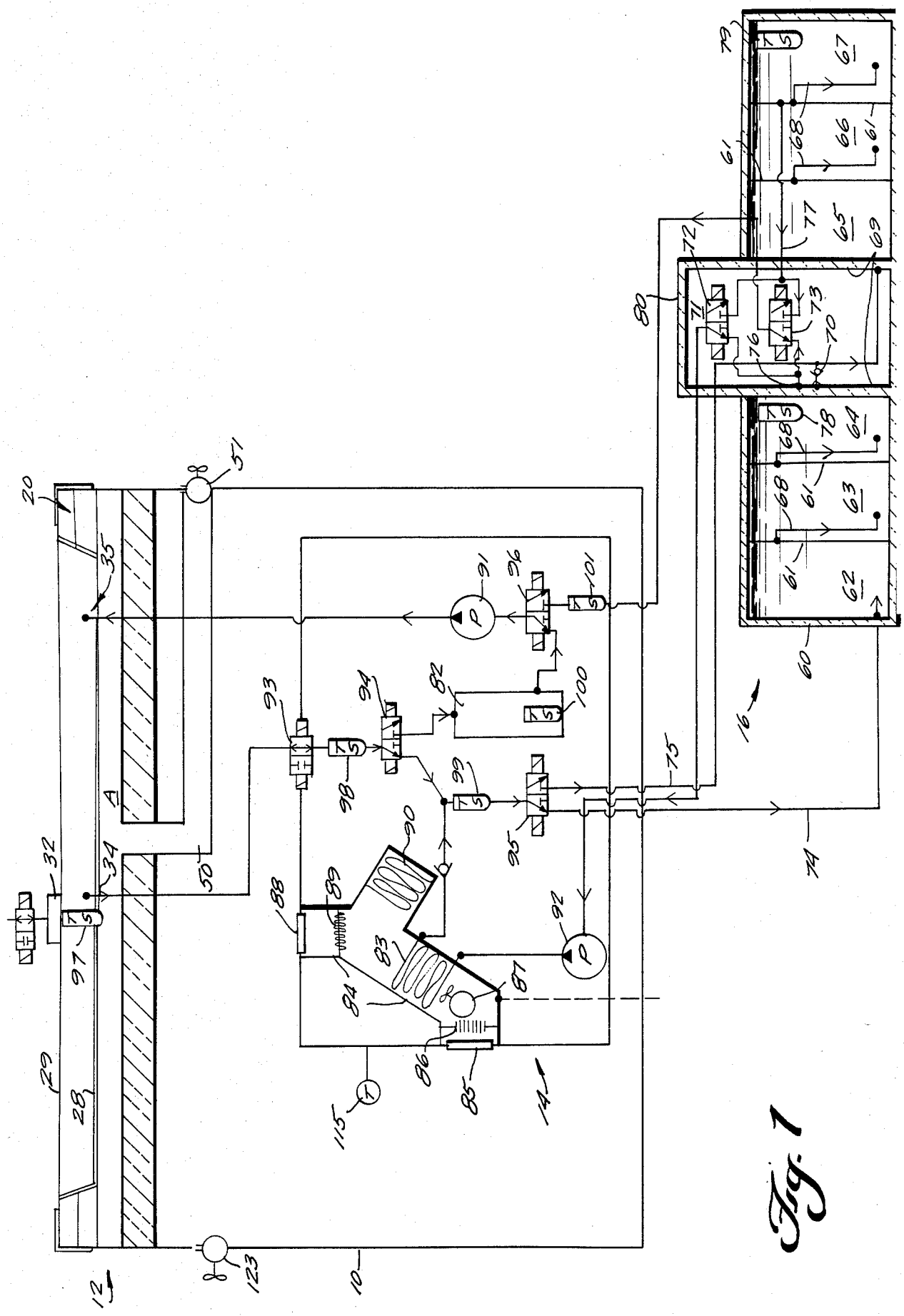

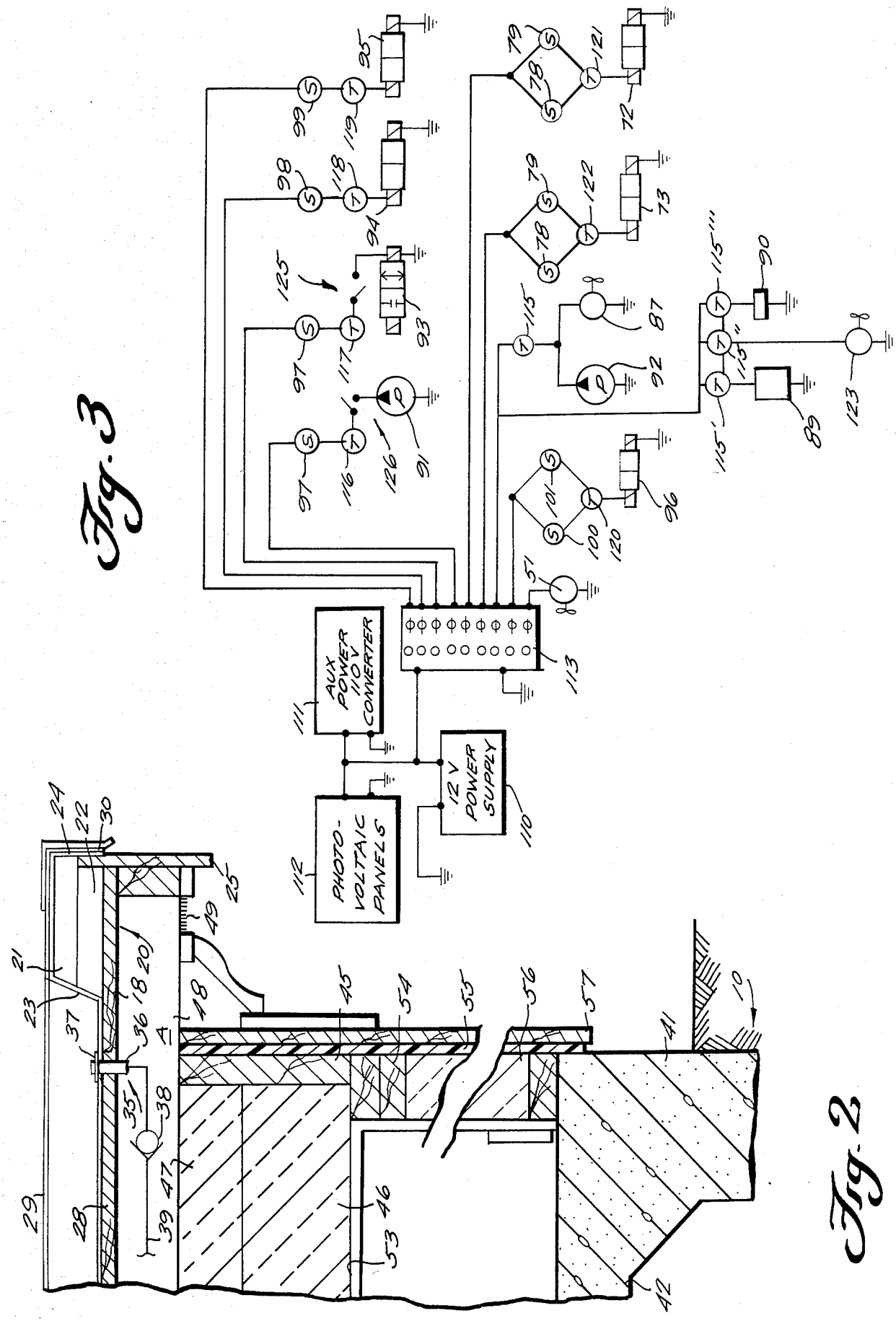

HEAT COLLECTION, DISSIPATION AND STORAGE

BACKGROUND AND SUMMARY OF THE INVENTION

The invention relates to a heat collection, dissipation and storage system, particularly one for utilization in solar energy systems. The invention contemplates maximizing utilization of the solar energy incident upon a building in as simple a manner as possible.

According to one aspect of the present invention, a complete roofing system is provided for a building, which roofing system is capable of making maximum utilizing of incident solar radiation and takes the place of conventional roofing materials. Mounted upon underlying building components are a plurality of wooden boards or the like which define an air space beneath a roof support sheet. The support sheet includes an edge means upstanding therefrom around the circumference thereof. Means are provided for defining a substantially water and air-tight volume within the volume defined by the support sheet and upstanding edge means, with the support sheet, edge means, and volume defining means covering the entire roof surface. The volume-defining means consists of first and second water impermeable membranes which are generally coextensive, the first membrane abutting the support sheet and edge means and the second membrane overlying the first membrane. Portions of both membranes overlap the edge means, and a steel band or the like is used for affixing overlapping portions of the membranes to the edge means around the outer periphery thereof to define the substantially liquid and air-tight volume between the membranes. Valve means are provided for intaking and exhausting air from between the membranes during draining and filling of the volume between the membranes with liquid.

The support sheet is supported so that it has a slight slope inwardly from the edge means to define a low drain point adjacent the center of the support sheet. A liquid outlet from the volume between the membranes is located at the low drain point, and a liquid inlet to between the membranes is located outwardly spaced from the low drain point adjacent to a portion of the edge means. Liquid conduit and circuitry means cooperate with the inlet and outlet for supplying liquid to and draining liquid from the volume between the membranes depending upon whether heating or cooling is desired, passing the liquid to and between a main and a secondary water storage tank, and utilizing a number of pumps, valves, temperature sensors, and a heat exchanger for effecting heat exchange between liquid circulating in the conduit and circuitry means and ambient air in the building.

According to another aspect of the present invention, an insulated liquid storage tank is provided for preferred utilization in solar energy storage systems, and is particularly useful with the system described above. The insulated storage tank comprises an outer surface generally defining the volume of the tank with a plurality of substantially vertically extending interior divisions formed within the outer surface and dividing the volume defined by the outer surface into a plurality of compartments. This provides for horizontal separation of liquid volumes within the tank. Liquid conduit means extend from the top of each of a plurality of the compartments into the bottom of the adjacent one of a plurality of the compartments to transport liquid through an interior division between the adjacent compartments. This provides vertical separation of liquid volumes within the tank. At least one liquid inlet is provided to the bottom of one of the compartments, and at least one liquid outlet is provided from the top of at least one of the compartments, and valve means are provided for controlling the introduction of liquid into and the withdrawal from the inlet and outlet respectively.

The insulated liquid storage tank preferably includes a central insulated pair of vertical partitions separating adjacent sets of compartments on either side thereof. A liquid inlet and outlet are provided to and from each of the sets of compartments divided by the central partitions. The tank is utilized with a plurality of automatically operated valves, pumps, and temperature sensors for controlling flow to and from the various compartments.

It is the primary object of the present invention to provide a simple yet effective system for solar heat collection, dissipation, and storage. This and other objects of the invention will become clear from an inspection of the detailed description of the invention and from the appended claims.

BRIEF DESCRIPTION OF THE DRAWINGS

FIG. 1 is a schematic view illustrating a building utilizing an exemplary roofing system according to the present invention in combination with an insulated liquid storage tank according to the present invention and various controls and auxiliary components for providing heating and/or cooling of the living space of the building;

FIG. 2 is a detail cross-sectional view showing a portion of the roofing system of FIG. 1; and FIG. 3 is a schematic electrical control diagram illustrating the manner in which various operative elements of the system of FIG. 1 are controlled.

DETAILED DESCRIPTION OF THE DRAWINGS

In FIG. 1 there is illustrated in schematic form a building 10 having a roofing system 12 adapted for the collection and dissipation of heat, in conjunction with heating and cooling and control components 14 and an insulated main storage tank 16. The roofing system 12 is specifically designed to cover the entire roof area of the building 10 and take the place of conventional roofing components. The roofing system consists of a few simple components and eliminates the need for any ballast material to resist wind loading.

The basic components of the roofing system are illustrated most clearly with respect to FIG. 2. The basic components include a support sheet 18 of plywood or other rigid sheet material, and an edge means, shown generally at 20, surrounding the support sheet around the circumference thereof and upstanding therefrom. The edge means 20 is shown in the exemplary embodiment of the invention illustrated in FIG. 2 as a pair of 2×6's 21, 22 nailed to the support sheet 18 and having a common tapered edge 23 leading down toward the support sheet 18 along the interior thereof. An exterior edge 24 is also provided by the edge means 20, being provided by the top 2×6 21 and a wooden skirt 25 nailed to the 2 by 6's 21, 22, in the exemplary embodiment of the invention illustrated in FIG. 2.

The basic roofing system also comprises means for defining a substantially water and air-tight volume within the volume defined by the support sheet 18 and upstanding edge means 20. The water and air-tight volume defining means consists of a first water and air impermeable membrane 28 abutting the support sheet and the edge means and overlapping the edge means, as illustrated in FIG. 2; a second water and air impermeable membrane 29 disposed above the first membrane 28 and generally coextensive therewith; and means, such as metal band 30, for affixing overlapping portions of the membranes 28, 29 to the exterior periphery 24 of the edge means 20 to define the substantially liquid and air-tight volume between the membranes. Preferably the membranes 28, 29 are formed of rubber about ⅛ inch thick, rubber being the preferred material for maintaining the desired properties over the life of the system, providing liquid and air impermeability, and the like. However other available membrane materials may be utilized in particular circumstances, such as pigmented polyvinyl chloride membranes and the like. Both membranes 28, 29 will desirably be dark colored so as to absorb sunlight. The overlapping edges of the membranes 28, 29 are affixed to the edge means 20 by the metal band 30 surrounding the periphery of the edge means, and fastener means, such as a plurality of screws, penetrating the metal band 30 and overlapping edges of the membranes 28, 29 and the edge means 20 to clamp the overlapping edges of the membranes 28, 29 to the edge means 20.

The basic roofing system also includes valve means, such as conventional air exhaust valve 32, located in a central portion of the upper membrane 29 (see FIG. 1) for exhausting air from between the membranes during filling of the volume between the membranes with liquid. By exhausting the air in this manner, flapping of the upper membrane 29 in response to wind conditions will not occur when the system is in use with a volume of liquid approximately 3 inches high between the membranes 28, 29. Means are also provided defining a liquid outlet 34 from the volume between the membranes 28, 29, and defining a liquid inlet 35 into the volume between the membranes. In the embodiment illustrated in FIG. 2, the inlet 35 includes an inlet tube 36 penetrating the support sheet 18 and an opening in the first membrane 28, with sealing material 37 being provided around the tube 36 between it and the membrane 28. If desired a check valve 38 may be provided in the pipe 39 extending from tube 36. An arrangement similar to that illustrated for the inlet 35 in FIG. 2 may be provided for the outlet 34.

Underlying building components such as a brick and block or concrete wall 41, and longitudinal supports 42, are provided for the building 10. Preferably thermal insulation is provided between such underlying components (e.g. 41, 42) and the roofing system 12, and additionally preferably an air space A is provided. The thermal insulation is of course desirable to help maintain a desired temperature within the living space of the building 10, and the air space A is primarily provided to allow venting of the air underneath the support sheet 18 and the collector/dissipator provided by the membranes 28, 29 to prevent conduction of unwanted heat from the roofing system into the building during warm weather.

One exemplary manner that the air space A and insulation can be provided according to the present invention is illustrated in FIG. 2. A number of 2×10's 45 or the like are disposed generally parallel to each other and operatively support the bottom of the support sheet 18. Batts of insulation, such as fiberglass insulation, 46, 47, are provided between the the 2×10's 45. If desired the tops of the 2×10's 45 may directly engage the support sheet 18, and the batt 47 would be eliminated to provide the air space in the volume above the batts 46 between the 2×10's 45. However in the embodiment illustrated in FIG. 2, a plurality of parallel spaced 2×4's 48 or the like are provided running perpendicularly to the 2×10's 45 and resting thereon, and supporting the bottom of the support sheet 18. Suitable vents, such as aluminum vent 49, are provided in the air space A, and means are provided for effecting powered movement of air through and from the air space A. Such means for providing powered movement of air are illustrated in FIG. 1 as the conduit 50 extending from air space A with a fan (such as a conventional attic fan) 51 exhausting air through the conduit 50. The air exhausted through the conduit 50 will be replaced by lower temperature air passing into the air space A through the vents 49.

As illustrated in FIG. 1, the underlying building components support the support sheet 18 so that it has a slight slope inwardly from the edge means 20 to define a low drain point adjacent the center of the support sheet 18. The outlet 34 is provided at the low drain point, while the inlet 35 is located outwardly spaced from the low drain point adjacent a portion of the edge means 20. A typical slope would be 1/16 inch per foot from the edge means 20 inwardly toward the outlet 34.

As illustrated in FIG. 2, it is also desirable to provide vapor barriers 53 between the underlying building components 41, 42 etcetera and the insulation 46, etcetera. Further structural support 54 may be provided around the periphery of the building components, as well as rigid insulation sheets 55, insulation batt 56, and siding 57.

The collector/dissipator defined by the membranes 28, 29 etcetera is operatively connected through outlet and inlet 34, 35 to liquid conduit and circuitry means, etcetera 14 for facilitating heating and cooling of the living space in the building 10, and it is operatively connected to the main insulated liquid storage tank 16. As seen in FIG. 1, the insulated storage tank 16 has an outer surface 60 generally defining the volume of the tank, and a plurality of substantially vertically extending interior divisions 61 are formed within outer surface 60 to divide the volume defined by the outer surface 60 into a plurality of compartments. In the embodiment illustrated in FIG. 1 compartments 62, 63, 64, 65, 66, and 67 are defined. Liquid conduit means 68, 68' extend from the top of each of a plurality of the compartments 62 through 66 into the bottom of an adjacent one of the compartments 63 through 67, to transport liquid through an interior division 61 between the adjacent compartments. Preferably, a central insulated pair of vertical partitions 69 are also provided, separating adjacent sets of compartments (i.e. with reference to FIG. 1 separating compartment sets 62 through 64 from compartment sets 65 through 67) on either side thereof from each other, with the liquid conduit means 68', having check valve 70 therein, interconnecting compartments 64 and 65 through the insulated partition 69. Between the insulated partitions 69 a cavity 71 is formed which may contain various operative components such as solenoid operated three-way valves 72 and 73.

At least one liquid inlet is provided to the bottom of one of the compartments, and preferably a first liquid inlet 74 is provided to the bottom of compartment 62 while a second liquid inlet 75 (which operatively communicates with liquid conduit 68') is connected to the bottom of compartment 65. At least one liquid outlet is also provided from the top of at least one of the compartments, preferably a first liquid outlet 76 being provided from compartment 64 and leading to both valves 72 and 73, and a second liquid outlet 77 being provided from compartment 67 and leading to both valves 72 and 73. Temperature sensors are also disposed within the compartments, such as temperature sensor 78 disposed in compartment 64, and temperature sensor 79 disposed in compartment 67. A removable cover or manway 80 is provided for the volume defined by the partitions 69 to allow access to the components within the volume 71.

The insulated main liquid storage tank, it will be seen, separates and partitions off layers of different temperature liquid to provide maximum heat-transfer ability of the stored liquid, which maximum heat-transfer ability would not exist if all stored liquid were within a single large volume. Of course any number of compartments and associated divisions 61 and liquid conduits 68 may be provided, and they may be arranged in any desired geometrical configuration to accomplish the intended results.

With further reference to FIG. 1, the liquid conduit and circuitry means, etcetera 14 preferably utilized with the collector/dissipator defined by membranes 28, 29 etcetera and the main insulated tank 16, include the following exemplary components: A secondary liquid storage tank (primarily for hot water) 82. Heat exchange means for providing heat exchange between liquid circulating in the conduit and circuitry means to ambient air in the building, such as heat exchanging coil 83 mounted in ductwork 84 and cooperating with the ambient air in the living space of the building 10 through a return air grill 85, and filter 86, with a fan 87 being provided for forcing the air from the living space in building 10 past the coil 83 and ultimately through supply air grill 88 back into the living space. And in ductwork 84 an auxiliary heating means may also be provided, such as the electric resistance coil 89, as well as an auxiliary cooling system, such as air conditioner coil 90.

The liquid conduit and circuitry means etcetera 14 also includes a first pump 91 and a second pump 92, a main two-way solenoid operated valve 93, a number of solenoid operated three-way valves 94, 95, and 96, and a plurality of temperature sensors including sensor 97 disposed between membranes 28, 29, sensor 98 disposed in operative association with the outlet 34 from between the membranes, and sensors 99, 100, and 101. Pipes interconnect all of the various components as illustrated in FIG. 1, for instance the first pump 91 being interconnected to valve 73 and secondary storage tank 82 through valve 96, and second pump 92 being connected to valve 72 and coil 83.

FIG. 3 illustrates the electrical control mean for automatically controlling operation of the components associated with the collector/dissipator 28, 29 etcetera, tank 16, and liquid conduit and circuitry means 14. Desired thermostatic controls for the various components are also illustrated in FIG. 3. The electrical components include a 12 volt power supply 110 which may be operatively connected to an auxiliary power 110 volt converter 111 and to photovoltaic panels 112 (or a windmill generator, or the like) for recharging of the supply 110. The power supply 110 is connected through electrical control panel 113 to the various components. Thermostat 115, provided in the main living space of the building 10, controls operation of pump 92 and fan 87, and separate thermostats 115', 115''', (&115'') may be provided to control the auxiliary heating and cooling elements 89, 90, (and fan 123) to effect primary control of the temperature within the living space in building 10.

With reference to FIG. 3, it is noted that sensor 97 between the membranes 28, 29 controls both first pump 91 and main valve 93, with thermostats 116, 117 provided to adjust the temperature at which the sensor 97 will activate the components 91, 93. Sensor 98 in a pipe connected to outlet 34 controls operation of the three-way valve 94 through thermostat 118, and sensor 99 just above the valve 95 controls the valve 95 position in conjunction with the thermostat 119. Sensor 100 in secondary storage tank 82 and sensor 101 in the line between valve 96 and valve 73 control operation of valve 96 through thermostat 120, while sensors 78 and 79 in the compartments 64, 67 respectively of insulated main storage tank 16 control valves 72 and 73 respectively in conjunction with thermostats 121 and 122.

Fan 51 for venting the air space A beneath the support sheet 18 is preferably controlled by its own thermostat in a manner similar to control of conventional attic fans. Additionally, the fan 123 may be provided for venting the living space in building 10, being controlled by thermostat 115''.

Exemplary apparatus according to the present invention having been described, a typical manner of operation thereof will now be set forth.

Operation

On a typical winter day with the main thermostat 115 set so that heat need be provided to the living space within the enclosure 10, pump 91 is activated to pump liquid to the volume between the membranes 28, 29. The liquid pumped to the volume between the membranes by pump 91 will be determined by the relative temperatures in compartments 64 and 67 of insulated storage tank 16, and the secondary liquid storage tank 82, as determined by the sensors 78, 79, 100 respectively. The coolest water will be pumped into the volume between the membranes 28, 29, the valves 73 and 96 being operated automatically to insure this. Liquid is pumped between the membranes 28, 29 until the entire volume therebetween is filled up, any air between the membranes 28, 29 being exhausted automatically through purge valve 32.

The sun's rays impacting upon membranes 28, 29 will cause the water between the membranes to heat up. Once the water reaches a predetermined temperature, as determined by sensor 97, main valve 93 will be opened and pump 91 restarted to allow hot water from the volume between the membranes 28, 29 to drain through outlet 34 while fresh cooler liquid is pumped into the volume by pump 91 through inlet 35. The storage area to which the withdrawn, heated liquid will be directed is determined by the temperature of the liquid at sensors 98, 100 and 99, which sensors 98, 99, 100 will effect operation of the valves 94 depending upon the temperature to either direct the water to secondary hot water storage tank 82 or to valve 95. Sensors 99, 78, 79 will effect operation of valve 95 depending upon temperature to either direct the water through inlet 74 or inlet 75 into compartments 62, 65 respectively of main tank 16.

When the thermostat 115 calls for more heat within the living space defined by the building 10, it controls operation of the second pump 92 and fan 87, the pump 92 circulating heated liquid from the main tank 16 through coil 83 with air from the living space being blown across the coil 83 by the fan 87, and being heated. The liquid pumped by the pump 92 will be the hottest liquid available in tank 16, being drawn from either compartment 67 or compartment 64 depending upon the position of valve 72 as determined by sensors 78, 79 in the compartments 64, 67 respectively. The liquid exiting coil 83, having had much of the heat thereof removed, will be returned through valve 95 to either inlet 75 or inlet 74 depending upon the temperature thereof as sensed by sensors 99, 78, 79.

Operation of the components as described above continues throughout the day. At night, the switch 125 (see FIG. 3) is actuated by sensor 97 or timer to open main valve 93, allowing all of the liquid to drain from between the membranes 28, 29 and pass into the storage tanks 16, 82. The next morning, the switch 125 is actuated by sensor 97 or timer to close the main valve 93 and the switch 126 (see FIG. 3) is actuated by sensor 97 or timer to effect operation of pump 91 to again fill the volume between the membranes 28, 29 with liquid.

During summer weather, when cooling is desired within the living space defined by the building 10, the day/night cycles of filling and draining the volume between the membranes 28, 29 are reversed, with the water between membranes being cooled at night and the volume between the membranes being dry during the day, except for heating of water in secondary liquid storage tank 82.

It will thus be seen that according to the present invention a simple roofing system has been provided for a building which takes the place of conventional roofing systems and is utilized effectively in conjunction with other components for heating and cooling the living space of the building with which the roofing system is associated. Additionally, an improved insulated liquid storage tank is provided which separates layers of liquid with varying temperature both vertically and horizontally allowing maximum utilization of the heat transfer of the liquid. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A roofing system comprising:
   a support sheet;
   an edge means surrounding said support sheet around the circumference thereof, and upstanding from said support sheet;
   means for defining a substantially water and air-tight volume within the volume defined by said support sheet and upstanding edge means, said volume-defining means consisting of: a first water and air impermeable membrane abutting said support sheet and said edge means, and overlapping said edge means; a second water and air impermeable membrane disposed above said first membrane, generally coextensive therewith; and means for affixing overlapping portions of said first and second membranes to said edge means around the outer periphery thereof to define a substantially liquid and air-tight volume between said membranes;
   valve means for providing exhausting of air from between said membranes during filling of the volume between said membranes with liquid;
   means defining a liquid outlet from the volume between said membranes;
   means defining a liquid inlet into the volume between said membranes;
   underlying building components for supporting said support sheet so that it has a slight slope inwardly from said edge means to define a low drain point adjacent the center of said support sheet;
   said means defining an inlet to between said membranes is located outwardly spaced from said low drain point, adjacent a portion of said edge means; and
   in combination with a building on which said roofing system is mounted, and including liquid conduit and circuitry means cooperating with said inlet and said outlet for supplying liquid to and draining liquid from the volume between said membranes, said liquid conduit and circuitry means comprising: a main liquid storage tank; a secondary liquid storage tank; heat exchange means for providing for heat exchange between liquid circulating in said conduit and circuitry means to ambient air in the building; pipe means interconnecting said inlet, outlet, tanks, and heat exchange means; sensor means for sensing the temperature in the volume between said membranes, said storage tanks, said outlet, and the ambient air in the building; first pump means for pumping liquid through said heat exchange means from said main storage tank; second pump means for pumping liquid from one of said tanks into said inlet between said membranes; valve means disposed in said pipe means between said inlet, outlet, tanks, pump means, and heat exchange means, for valving liquid flow to various of the components; and electrical control means for controlling said pump means and valve means in response to the temperature of the sensed liquid within the various volumes being sensed, and depending upon the sensed air temperature within the building.

2. An insulated liquid storage tank mounted in a predetermined position with respect to the vertical, said tank comprising: an outer surface generally defining the volume of the tank; a plurality of substantially vertically extending interior divisions formed within said outer surface and dividing the volume defined by said outer surface into a plurality of light-tight compartments; liquid conduit means extending from the top of each of a plurality of said compartments into the bottom of the adjacent one of a plurality of said compartments, to transport liquid through an interior division between the adjacent compartments, said compartments operatively communicating only through said liquid conduit means; at least one liquid inlet to the bottom of one of said compartments; at least one liquid outlet from the top of at least one of said compartments; valve means for controlling the introduction of liquid into, and the withdrawal of liquid from, said inlet and outlet, respectively; a central insulated pair of vertical partitions separating adjacent sets of compartments on either side thereof from each other with a said liquid conduit means extending from one abutting compartment on one side of said insulated separating partitions to another abutting compartment on the other side of said insulated separating partitions, with a check valve disposed in said liquid conduit means; wherein said at least one liquid inlet comprises two liquid inlets, one to a compartment on either side of said separating partitions; wherein said at least one liquid outlet comprises two liquid outlets, one from a compartment on either side of said separating partitions, the compartment containing the outlet being remote from the compartment containing the inlet on each side of said separating partitions; further comprising: first and second pumps; first and second three-way valves located in the volume between said insulated separating partitions, said first valve being operatively connected to both of said liquid outlets and to said first pump, and said valve being operatively connected to both of said liquid outlets and to said second pump; a plurality of temperature sensors, including a temperature sensor disposed in each of said compartments including said liquid outlets; and electrical control means for operating said first and second valves and said first and second pumps in response to predetermined values sensed by said sensors.

* * * * *